United States Patent
Kadosh et al.

(10) Patent No.: US 10,250,489 B2
(45) Date of Patent: Apr. 2, 2019

(54) MULTI-CHASSIS LINK AGGREGATION LEARNING ON STANDARD ETHERNET LINKS

(71) Applicant: MELLANOX TECHNOLOGIES TLV LTD., Ra'anana (IL)

(72) Inventors: Matty Kadosh, Hadera (IL); Gil Levy, Hod Hasharon (IL); Aviv Kfir, Nili (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 13 days.

(21) Appl. No.: 15/635,244

(22) Filed: Jun. 28, 2017

(65) Prior Publication Data

US 2019/0007301 A1 Jan. 3, 2019

(51) Int. Cl.
*H04L 12/709* (2013.01)
*H04L 12/753* (2013.01)
*H04L 12/741* (2013.01)
*H04L 12/775* (2013.01)
*H04L 12/721* (2013.01)

(52) U.S. Cl.
CPC ........... *H04L 45/245* (2013.01); *H04L 45/48* (2013.01); *H04L 45/745* (2013.01); *H04L 45/583* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 8,730,963 B1 * | 5/2014 | Grosser, Jr. | H04L 12/462 370/219 |
| 2014/0126351 A1 * | 5/2014 | Tatsumi | H04L 45/28 370/219 |
| 2014/0161132 A1 * | 6/2014 | Tatsumi | H04L 49/557 370/401 |
| 2014/0307540 A1 * | 10/2014 | Duda | H04L 41/082 370/220 |
| 2015/0319083 A1 * | 11/2015 | Grosser, Jr. | H04L 41/12 370/218 |
| 2016/0036728 A1 | 2/2016 | Duda | |
| 2016/0149759 A1 | 5/2016 | Anumala et al. | |
| 2016/0337272 A1 * | 11/2016 | Berman | H04L 49/70 |
| 2017/0099187 A1 | 4/2017 | Dale et al. | |
| 2017/0126490 A1 | 5/2017 | Berly et al. | |
| 2017/0163473 A1 * | 6/2017 | Sadana | H04L 41/0645 |
| 2017/0257309 A1 * | 9/2017 | Appanna | H04L 45/245 |

* cited by examiner

*Primary Examiner* — Alex Skripnikov
(74) *Attorney, Agent, or Firm* — Kligler & Associates

(57) ABSTRACT

A stacked switch packet communication system is connected to a Multi-Chassis Link Aggregation Group (MLAG). Devices in the system include a designated device for receiving packets that are destined for the MLAG. A new MLAG device is enabled while continuing packet communication by identifying an address of a single port in the new MLAG device. In first updates of the devices the single port is established in the forwarding databases of the devices and the packets transmitted through the devices to the single port. Thereafter, in second updates the single port is replaced in the forwarding databases by another port of the new MLAG device. Upon completion of respective second updates, the packets are transmitted through the devices to the other port in the MLAG.

12 Claims, 4 Drawing Sheets

MULTI-CHASSIS LINK AGGREGATION LEARNING ON STANDARD ETHERNET LINKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to data switching networks. More particularly, this invention relates to arrangements for maintenance or administration of switching networks that involve multi chassis link aggregation.

2. Description of the Related Art

The meanings of certain acronyms and abbreviations used herein are given in Table 1.

TABLE 1

Acronyms and Abbreviations

| | |
|---|---|
| BFS | Breadth-First Search |
| BUM | Broadcast, Unknown unicast and Multicast traffic |
| EVPN | Ethernet Virtual Private Network |
| FDB | Forwarding DataBase |
| IP | Internet Protocol |
| LAG | Link Aggregation Group |
| MAC | Media Access Control |
| MLAG | Multi-chassis Link Aggregation Group |
| NIC | Network Interface Card |

In a link aggregation group (LAG), two entities, e.g., a network switch or NIC, are connected by more than one physical interface. Today it is common to stack Ethernet switches together using a LAG to form a linked stack group having a single IP address. The number of ports of a single switch is limited by its radix of N ports. Advantageously, by combining switches in a stack group, the stack group is seen as if it were a single switch having a larger number of ports. A physical port in a LAG is known as a LAG member Stack groups of switches are frequently installed in a common chassis. Stock groups themselves may be linked together, a configuration known as Multi-chassis Link Aggregation Group (MLAG). However a common physical chassis is not essential to support this configuration, so long as the switches are arranged to present a common IP address. In one application a MLAG is defined when a stacked switch system is connected to another entity with a LAG and the LAG members on the stack reside on more than one switch. Arrangements of this sort provide simplicity of management, with a single IP address, as well as redundancy. In the event of that one of the switches in a stock group fails, the others continue operation. Typically, a master switch is designated to control the operation of an entire stack or group of stacks when the network is configured using a MLAG. A common application is a NIC connected to a system using a MLAG.

In a typical stacked system each switch has network ports and stack ports. The stack ports are used to create connections between the switches to define the stack group, while the network ports are used to provide standard Ethernet links. The switches in a stack system can be connected in various topologies such as ring, mesh, clos, etc. The selected topology determines the bandwidth, latency and cost of the system.

Conventionally, the switches in a stack can be connected by one of the following MAC layer options:

Standard Ethernet. When using standard Ethernet each switch performs bridging or routing as if it was a single device in a stack.

Proprietary. Different switches in the stack provide different packet processing. Packets forwarded on a stack interface are accompanied by a proprietary header. The header is used to exchange information between the devices. Packet forwarded is based on the contents of the proprietary header. When a packet is transmitted outside the stack the proprietary header is removed. The proprietary header enables enhanced features that are supported by a single device from a particular vendor.

SUMMARY OF THE INVENTION

The functional requirements for LAG and MLAG are similar: A packet designated to a MLAG must be sent to the MLAG only once. This includes unicast packets, multicast (registered and unregistered), broadcast packets and unicast packets having destination addresses that are not in the databases of the MLAG. Packets in the last category is are sometimes referred to as "unknown unicast packets".

The above requirement is challenging when a new MAC in a MLAG is learned by other network elements connected to the MLAG. In a conventional stack system based on a proprietary MAC layer interface, the first switch facing a network port may decide on the forwarding of the packet. If this switch has not yet learned the new MAC, the packet is classified as unknown and flooded in the stack, i.e., transmitted through all ports of the switch except for the packet's ingress port. Moreover, if the first switch decides that packet is to be flooded, then all the other devices will treat the packet as flooded. The packet is forwarded by the proprietary MAC layer interface to switches on the stack according to the packet descriptor. In a normal non-promiscuous mode of operation only the network element with a matching hardware MAC address accepts such a packet.

Embodiments of the invention adapt to configuration changes in a MLAG as well as in an EVPN without resort to proprietary headers and protocols.

There is provided according to embodiments of the invention a method, which is carried out by connecting a stacked switch system to a Multi-Chassis Link Aggregation Group (MLAG). The system includes a set of devices for communication of data packets, wherein the devices each have a plurality of physical ports and a forwarding database. There is a designated device for receiving packets that are destined for the MLAG. Enabling a new MLAG device is carried out while communicating the packets through the stacked switch system by identifying an address of a single port in the new MLAG device. In first updates of the devices the single port is established in the forwarding databases of the devices, and the packets are transmitted through the devices to the single port. Thereafter, in second updates of the devices the single port is replaced by another port in the new MLAG device in the forwarding databases, and upon completing respective second updates the packets are transmitted through the devices to the other port in the MLAG.

Yet another aspect of the method includes updating the forwarding database of the devices in the first updates and the second updates in order of respective distances thereof from the MLAG.

Still another aspect of the method includes defining a tree of the system whose root includes the designated device, and updating the forwarding database of the devices comprises visiting the devices in a breadth-first search (BRS) of the tree.

An additional aspect of the method includes defining a tree of the system whose root includes the designated device, and updating the forwarding database of the devices comprises visiting the spine devices of the system first and then the leaf devices of the system in a traversal of the tree.

According to one aspect of the method, the address of the new MLAG device is a Media Access Control (MAC) address.

According to a further aspect of the method, updating the forwarding database in the first updates and the second updates includes updating an egress port of the devices.

There is further provided according to embodiments of the invention an apparatus, including a stacked switch system connected to a Multi-Chassis Link Aggregation Group (MLAG). The system includes a stack controller and a set of devices for communication of data packets, wherein the devices have a plurality of physical ports and a forwarding database. There is a designated device for receiving packets destined for the MLAG. The stack controller is operative for transmitting control signals to the devices to enable a new MLAG device and the devices are operative, responsively to the control signals and while communicating the packets through the stacked switch system for:

identifying an address of a single port in the new MLAG device, and in first updates of the devices establishing the single port in the forwarding database thereof and transmitting the packets through the devices to the single port. Thereafter in second updates the devices are operative for replacing the single port by another port in the new MLAG device in the forwarding database thereof, and upon completing each of the second updates transmitting the packets through the devices to the other port in the MLAG.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.
Overview.

Figure 1:
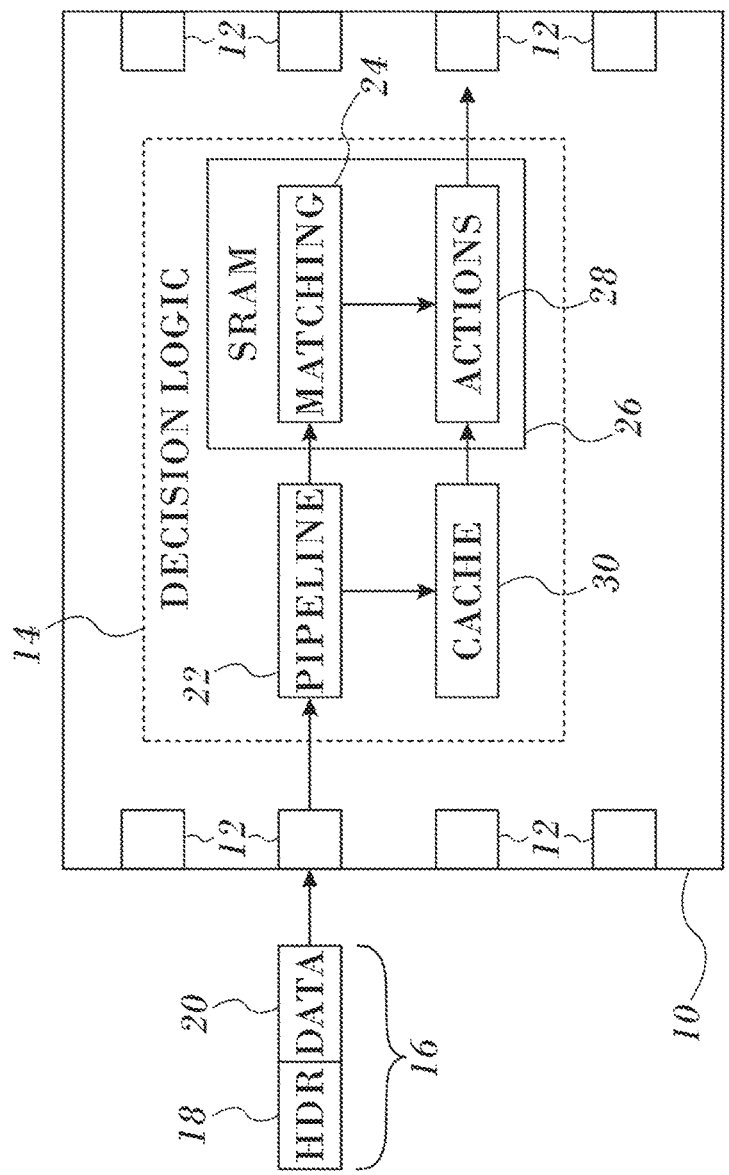
FIG. 1 is a block diagram of a typical network element, which transmits packets in accordance with an embodiment of the invention.

Turning now to the drawings, reference is now made to FIG. 1, which is a block diagram of typical network element 10, which transmits packets in accordance with an embodiment of the invention. The element 10 may be a component of a LAG or MLAG. It can be configured as a network or fabric switch or a router, for example, with multiple ports 12 connected to a packet communication network or fabric. Decision logic 14 within element 10 applies classification rules in forwarding data packets 16 between ports 12, as well as performing other actions, such as encapsulation and decapsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 14.

In the pictured embodiment, decision logic 14 receives packets 16, each containing a header 18 and payload data 20. A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries. For this purpose, each rule entry typically contains a pointer to the particular action that decision logic 14 is to apply to packets 16 in case of a match. Pipeline 22 typically comprises dedicated or programmable hardware logic, which is configured to carry out the functions described herein.

In addition, network element 10 typically comprises a cache 30, which contains rules that have not been incorporated into the matching database 24 in SRAM 26. Cache 30 may contain, for example, rules that have recently been added to network element 10 and not yet incorporated into the data structure of matching database 24, and/or rules having rule patterns that occur with low frequency, so that their incorporation into the data structure of matching database 24 would be impractical. The entries in cache 30 likewise point to corresponding actions 28 in SRAM 26. Pipeline 22 may match the classification keys of all incoming packets 16 against both matching database 24 in SRAM 26 and cache 30. Typically, when there is a cache miss in cache 30, database 24 is addressed to determine if a given classification key matches any of the rule entries in database 24 MLAG Traffic Flow.

When a MLAG stack is based on standard Ethernet links, each device performs standard layer 2 (bridge) forwarding. When a new MAC on a MLAG is learned it is virtually impossible complicated to update all FDBs of all the switches on the stack at the same time unless specialized hardware is provided for that purpose. The transition time, in which some of the switches have learned the new MAC while others have not, can lead to undesirable cases where a packet is either received multiple times on the MLAG or is not received at all by the MLAG. This behavior occurs when some switches perform unicast forwarding while others preform flood forwarding of an unknown packet. Controlling the learning order of the new MAC on the switches does not always resolve the problem.

Figure 2:
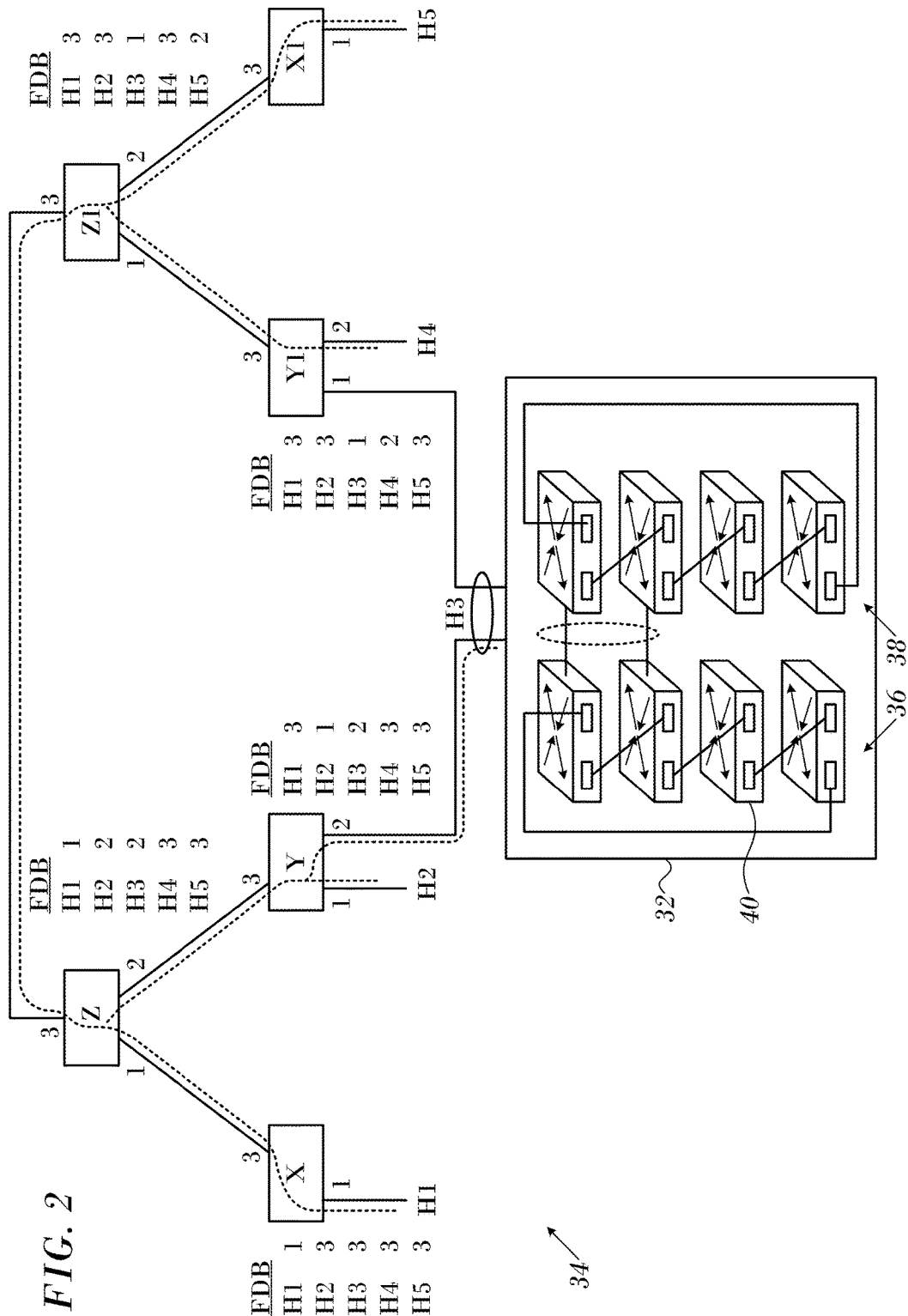
FIG. 2 is a schematic diagram illustrating difficulties in learning a new address, which can be solved in accordance with an embodiment of the invention.

Reference is now made to FIG. 2, which is a schematic diagram illustrating a stage of learning a new MAC while processing packet flows in a stacked switch system 34, which can be performed in accordance with an embodiment of the invention. Stacked switch system 34 comprises switches X, Y, Z, X1, Y1, Z1. MLAG 32 is connected to the stacked switch system 34. Forwarding databases (FDB) are shown at the right of the switches. The format of each FDB is, from left to right: link number and physical port number. The physical port numbers indicated in the FDBs are displayed above and below the switches.

In this example MLAG 32 comprises two linked stack groups 36, 38. Assume that a switch 40 in stack group 36 has just come on line and that the MAC of switch 40 is not yet known to the other switches X, Y, Z, X1, Y1, Z1 in the stacked switch system 34. All the devices in the stacked switch system 34 are configured to flood BUM packets to all devices in the stacked switch system 34.

In general BUM traffic should be forward to all switch interfaces in a MLAG system in case a MLAG interface, e.g. MLAG 32 is built for more than one device. In the event that each device member in the MLAG floods the BUM traffic to its local ports the MLAG interface will receive one copy per device member in the MLAG. One method for preventing BUM traffic duplication is to select, for each MLAG interface, a single device, known as the BUM-designated forwarder. The single device forwards the BUM traffic.

Accordingly, a packet is not forwarded to the MLAG 32 by an egress device in the stacked switch system 34 unless it has been designated to do so. Switch Y is the designated switch for flooding traffic to the MLAG 32 via link H3. Thus, switch Y can forward packets to the MLAG 32, but switch Y1 cannot, even though both switches Y, Y1 share the link H3 leading to the MLAG 32.

Assume that a BUM packet is sent from link H1 to link H3. Link H3 is connected to the stacked switch system of MLAG 32. The MAC that can be reached via link H3 is not known to any of the switches. The flooding of the BUM packet is represented by a broken line extending from link H1 to the other switches Y, Z, X1, Y1, Z1 of the stacked switch system 34.

Figure 3:
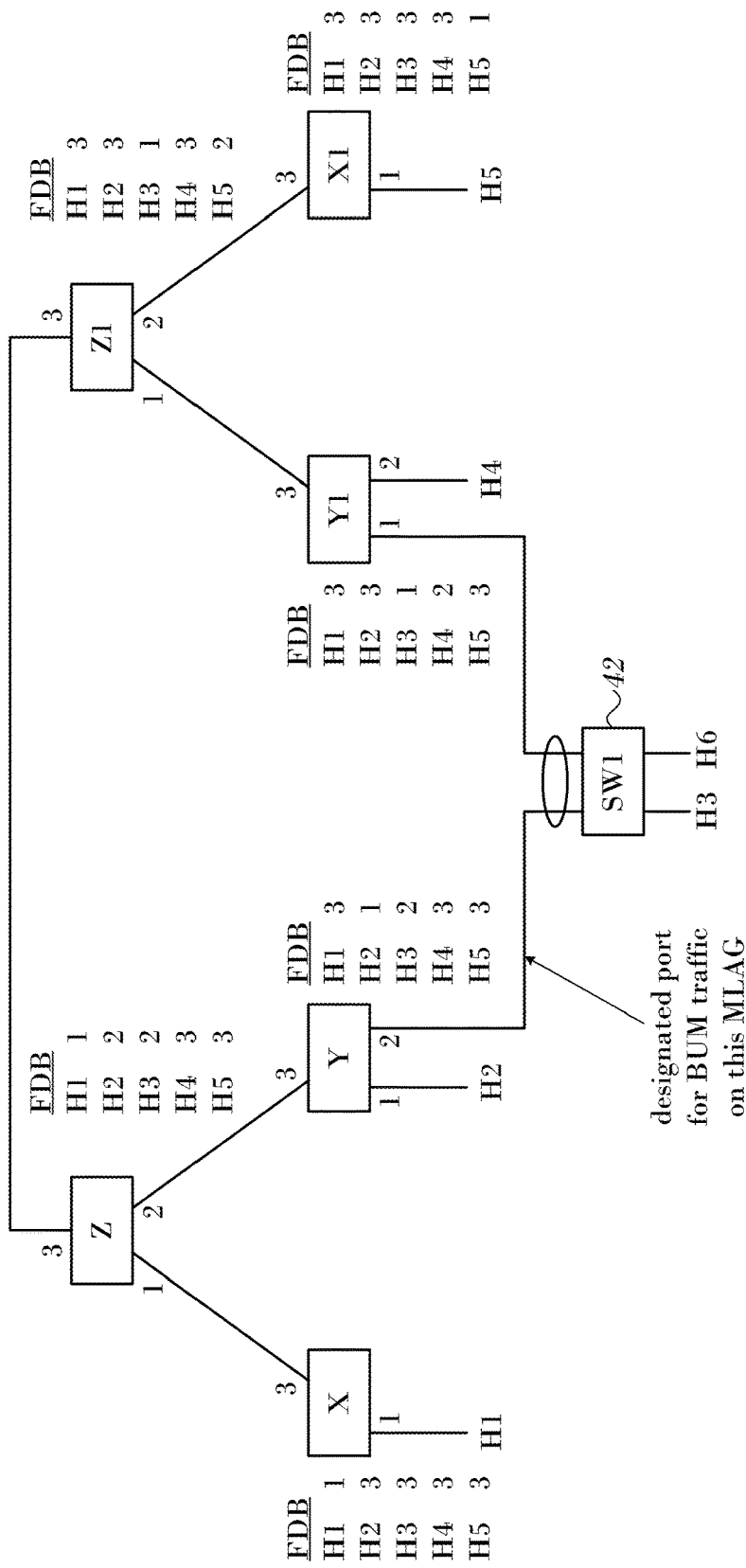
FIG. 3 is a schematic diagram illustrating BUM-designated forwarding to a MLAG interface, which can be performed in accordance with an embodiment of the invention.

Reference is now made to FIG. 3, which is a schematic diagram illustrating BUM-designated forwarding to a MLAG interface, which can be performed in accordance with an embodiment of the invention. Port 2 of switch Y is the designated port for BUM traffic to a MLAG 42, which has egress ports H3 and H6. BUM traffic, which needs to flow through MLAG 42 through either port H3 or H6 reaches MLAG 42 only via port 2 of switch Y.

Problem to be Solved

Figure 4:
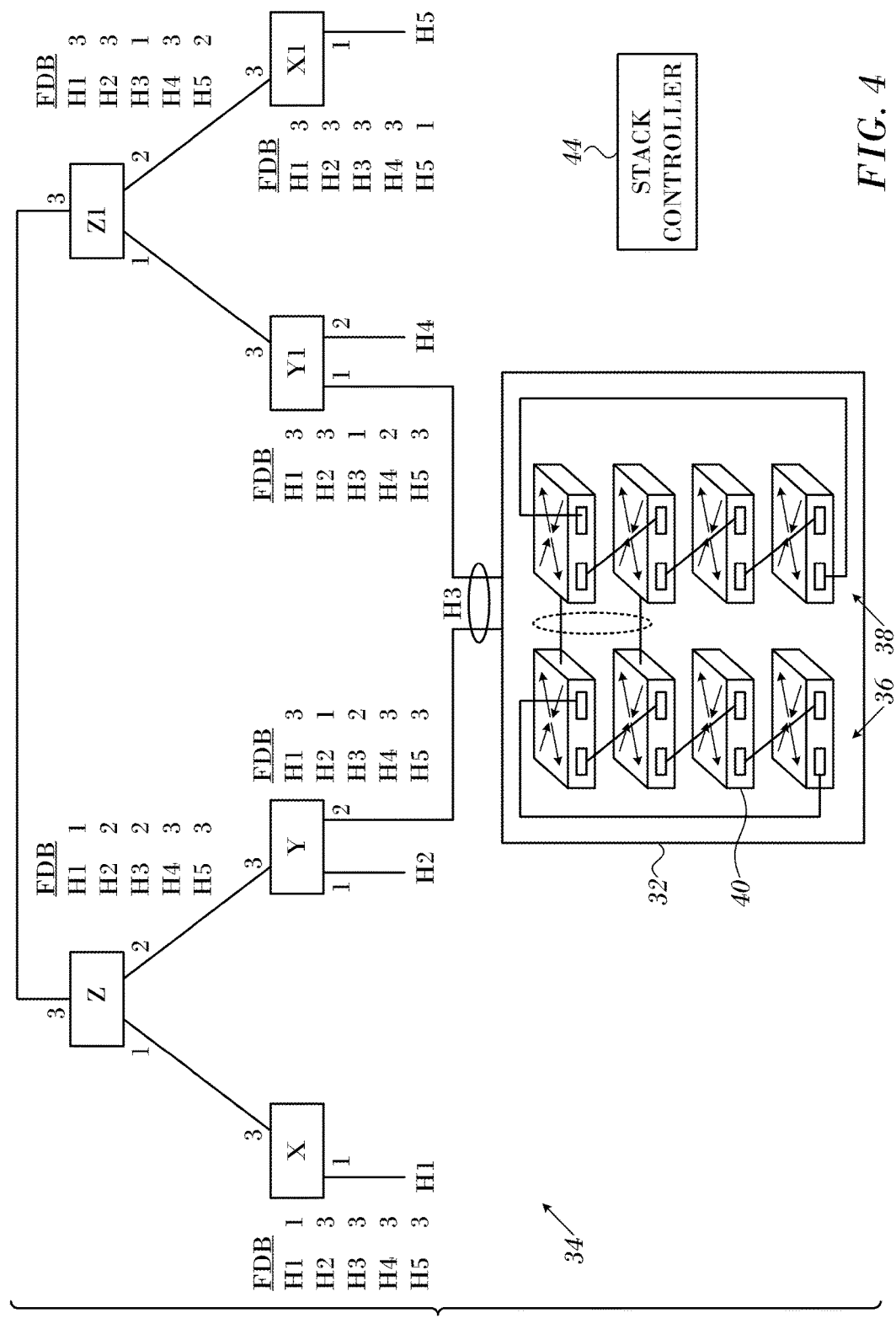
FIG. 4 is a diagram similar to FIG. 2 illustrating a solution of the difficulties shown in FIG. 2 in accordance with an embodiment of the invention.

Reference is now made to FIG. 4, which is a diagram similar to FIG. 2 that illustrates the MLAG learning problem, which is solved in accordance with an embodiment of the invention. The issues described below are not relevant on arrangements that lack a MLAG. Assume the existence of a centralized stack controller 44. The stack controller 44 is triggered to send control signals to the stack to instruct the stack to learn the destination address of an arriving BUM packet. When the arrangement includes a MLAG, any sequence of learning may produce one of the following undesirable results:

1. The packet is not sent to the MLAG.
2. The packet is sent twice to the MLAG.

In this example assume a packet is forwarded from link H5 to link H3 where the destination address is on the MLAG 32 and the stacked switch system 34 is in a process of learning a new MAC address in the MLAG 32. Switch Y is designated for flooding to the MLAG 32. Two learning orders are discussed:

Learning Order 1. Spine switches learn MAC addresses first; then leaf switches learn:
1. Spine switch Z1 performs unicast forwarding to Switch Y1, link 1. (the packet does not reach switch Z because it is not on the optimum path to the MLAG 32).
2. Leaf switch Y1 performs flooding. However it does not forward the packet to the MLAG 32 because it is not the designated switch for flooding for this MLAG.

Result: The packet does not reach the MLAG 32.

Learning Order 2. Leaf switches learn MAC addresses first; then the spine switches learn.

Switch Z1 performs flooding.

Switch Y1 performs unicast forwarding to MLAG 32 (copy #1). Leaf switch Y1, having learned the MAC addresses of the MLAG 32, does not need to flood packets to MLAG 32; it can forward them directly to the MLAG 32 via link H3.

Spine Switch Z receives the packet from switch Z1 and also performs flooding, because it has not yet learned the MAC addresses.

Leaf switch Y has learned the MAC address and performs unicast forwarding to the MLAG 32 (copy #2)

Result: The packet is forwarded twice to the MLAG 32.

Solution

According to an embodiment of the invention, the problem outlined above is solved by learning MAC addresses in two phases. The strategy is as follows:

Phase 1: Learn the MAC of a single port of a single switch device on the MLAG in all devices (no local port). The single switch device must be the designated BUM device, e.g., in FIG. 3, all the devices could learn the MAC of port H6.

Unicast: Traffic to the new MAC on the MLAG is always received on the same port. The learning order is according to a breadth-first search (BFS) of a tree having the designated BUM device as its root (switches Y→Z→X, Z1→Y1,X1).

Multicast: The single port is the designated port for BUM traffic.

Phase 2: Roam from leaf to spine and change the FDB to indicate optimal (shortest path) forwarding to a local port. As noted above in phase 1, the learning order is according to a breadth-first search (BFS) of a tree having the designated BUM device as its root.

Update the FDBs of all the switches to send the packet to the MLAG ports (load balancing based, for example on hashing). The updates are done in order of the distances (number of hops) of the switches from the MLAG, starting from the closest switch to the MLAG.

This procedure ensures that the new MAC on the MLAG will always receive one and only one instance of a packet during a transitional period in which not all the FDBs are fully synchronized to accommodate the new MAC.

Reverting to the example FIG. 3, when the two orders of learning are performed according to the principles of the invention, the effect when a new packet of BUM traffic is received is as follows:

Phase 1.

Learning Order 1. Spine switches learn MAC addresses first; then leaf switches learn. The learning order is accomplished by a BFS:
  Switch Z1 Performs unicast forwarding to switch Z.
  Switch Z performs unicast forwarding to switch Y.
  Switch Y performs unicast forwarding. Since switch Y is the designated port of the MLAG 32, traffic is forwarded to MLAG 32.
Result: A single copy of the packet is forwarded to the MLAG 32 from port 2 of switch Y via link H3.

Learning Order 2. Leaf switches learn MAC addresses first; then the spine switches learn.
  Switch Z1 performs flooding
  Switch Y1 performs unicast forwarding. However the forwarding decision is to link H3. Therefore, the packet is source-filtered, i.e., it never transits link H3, since switch Y1 is not the designated MLAG device.
  Switch Z performs flooding.
  Switch Y1 performs unicast forwarding to the MLAG 32.
Result: A single copy is forwarded to the MLAG 32.

Phase 2.

Update FDB's of the switches (X, Y, Z, X1, Y1, Z1) in order of distance from the MLAG 32.

1. Select egress port of switch for route leading to MLAG 32. This can be accomplished, for example, by executing a known load-balancing algorithm. For example, Port 1 would typically be selected for the switch Y1. Similarly, port 1 would probably be selected for the switch Z1, as the path Z1→Y1→H3 is shorter than the alternative path Z1→Z→Y→H3.

2. Update the FDB of the switch to indicate the selected egress port. Because of the FDB update order, a packet arriving from a higher level of the tree cannot be misdirected to a longer path than the path defined by the FDB a lower level switch.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
    connecting a stacked switch system to a Multi-Chassis Link Aggregation Group (MLAG), the system comprising a set of devices for communication of data packets, wherein the devices each have a plurality of physical ports and a forwarding database, the devices including a designated device for receiving ones of the packets destined for the MLAG, the set of devices having spine devices and leaf devices;
    enabling a new MLAG device; and
    while communicating the packets through the stacked switch system:
    identifying an address of a single port in the new MLAG device and in first updates of the devices establishing the single port in the forwarding database of each of the devices; and
    transmitting the packets through the devices to the single port; and
    thereafter in second updates of the devices replacing the single port by another port in the new MLAG device in the forwarding database of each of the devices; and
    upon completing each of the second updates transmitting the packets through the devices to the other port in the MLAG.

2. The method according to claim 1, further comprising in the first updates and the second updates updating the forwarding database of each of the devices in order of respective distances thereof from the MLAG.

3. The method according to claim 1, further comprising defining a tree having a root comprising the designated device, and updating the forwarding database of each of the devices by visiting the devices in a breadth-first search (BRS) of the tree.

4. The method according to claim 1, further comprising defining a tree having a root comprising the designated device, and updating the forwarding database of each of the devices by visiting the spine devices first and then the leaf devices in a traversal of the tree.

5. The method according to claim 1, wherein the address of the new MLAG device is a Media Access Control (MAC) address.

6. The method according to claim 1, wherein updating the forwarding database in the first updates and the second updates comprises updating an egress port of each of the devices.

7. An apparatus, comprising:
    a stacked switch system connected to a Multi-Chassis Link Aggregation Group (MLAG), the system comprising a stack controller and a set of devices for communication of data packets, wherein each of the devices has a plurality of physical ports and a forwarding database, the devices including a designated device for receiving ones of the packets destined for the MLAG, the set of devices having spine devices and leaf devices, wherein the stack controller is operative for transmitting control signals to the devices to enable a new MLAG device and wherein each of the devices is operative, responsively to the control signals and while communicating the packets through the stacked switch system, for:
    identifying an address of a single port in the new MLAG device and in first updates of the devices establishing the single port in its forwarding database; and
    transmitting the packets through others of the devices to the single port; and
    thereafter in second updates of the devices replacing the single port by another port in the new MLAG device in its forwarding database; and
    upon completing each of the second updates transmitting the packets through the devices to the other port in the MLAG.

8. The apparatus according to claim 7, wherein in the first updates and the second updates the forwarding database of each of the devices is updated in order of respective distances thereof from the MLAG.

9. The apparatus according to claim 7, wherein each of the devices is operative for updating its forwarding database in a breadth-first search of a tree having a root comprising the designated device.

10. The apparatus according to claim 7, wherein each of the devices is operative for updating its forwarding database by visiting the spine devices first and then the leaf devices in a traversal of a tree having a root comprising the designated device.

11. The apparatus according to claim 7, wherein the address of the new MLAG device is a Media Access Control (MAC) address.

12. The apparatus according to claim 7, wherein updating the forwarding database in the first updates and the second updates comprises updating an egress port of each of the devices.

* * * * *